Oct. 20, 1931.  M. S. CARMICHAEL  1,828,488
ELEVATING DEVICE
Filed Jan. 24, 1928  3 Sheets-Sheet 2
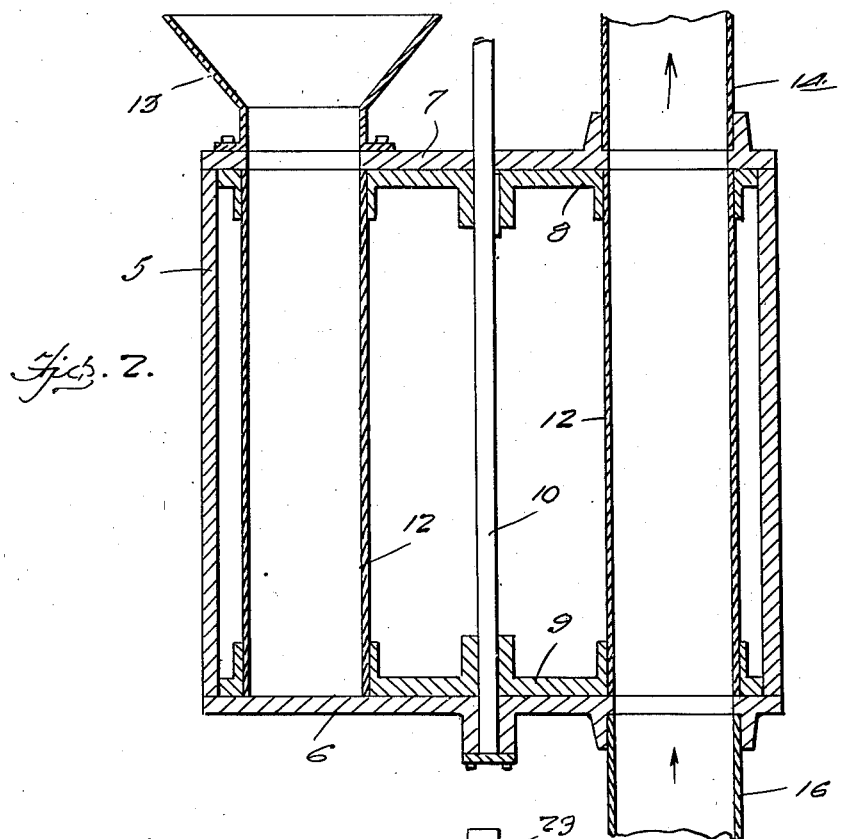
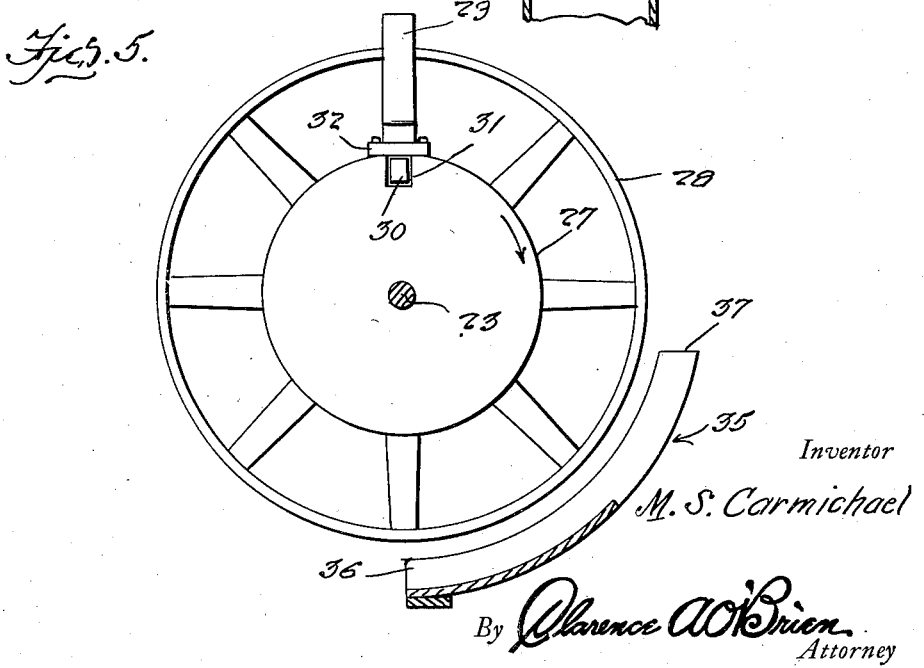
Inventor
M. S. Carmichael
By Clarence A. O'Brien
Attorney Oct. 20, 1931.  M. S. CARMICHAEL  1,828,488
ELEVATING DEVICE
Filed Jan. 24, 1928  3 Sheets-Sheet 3
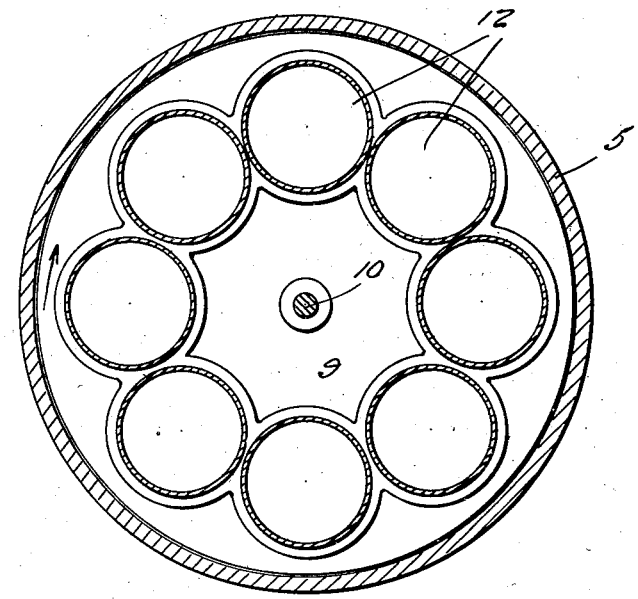
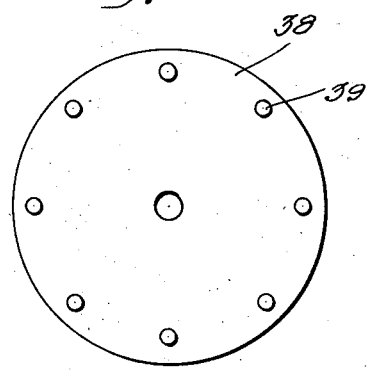
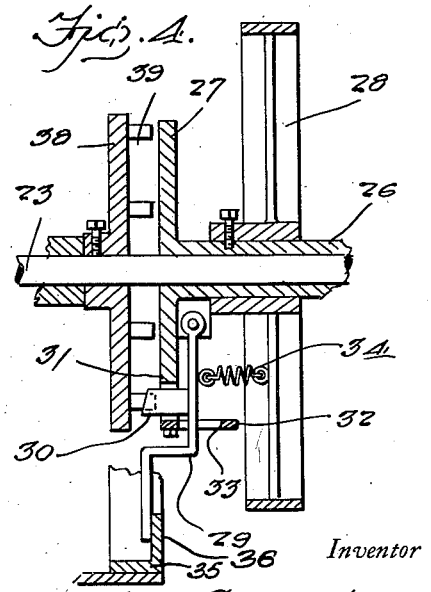
Inventor
M. S. Carmichael
By Clarence A. O'Brien
Attorney Patented Oct. 20, 1931

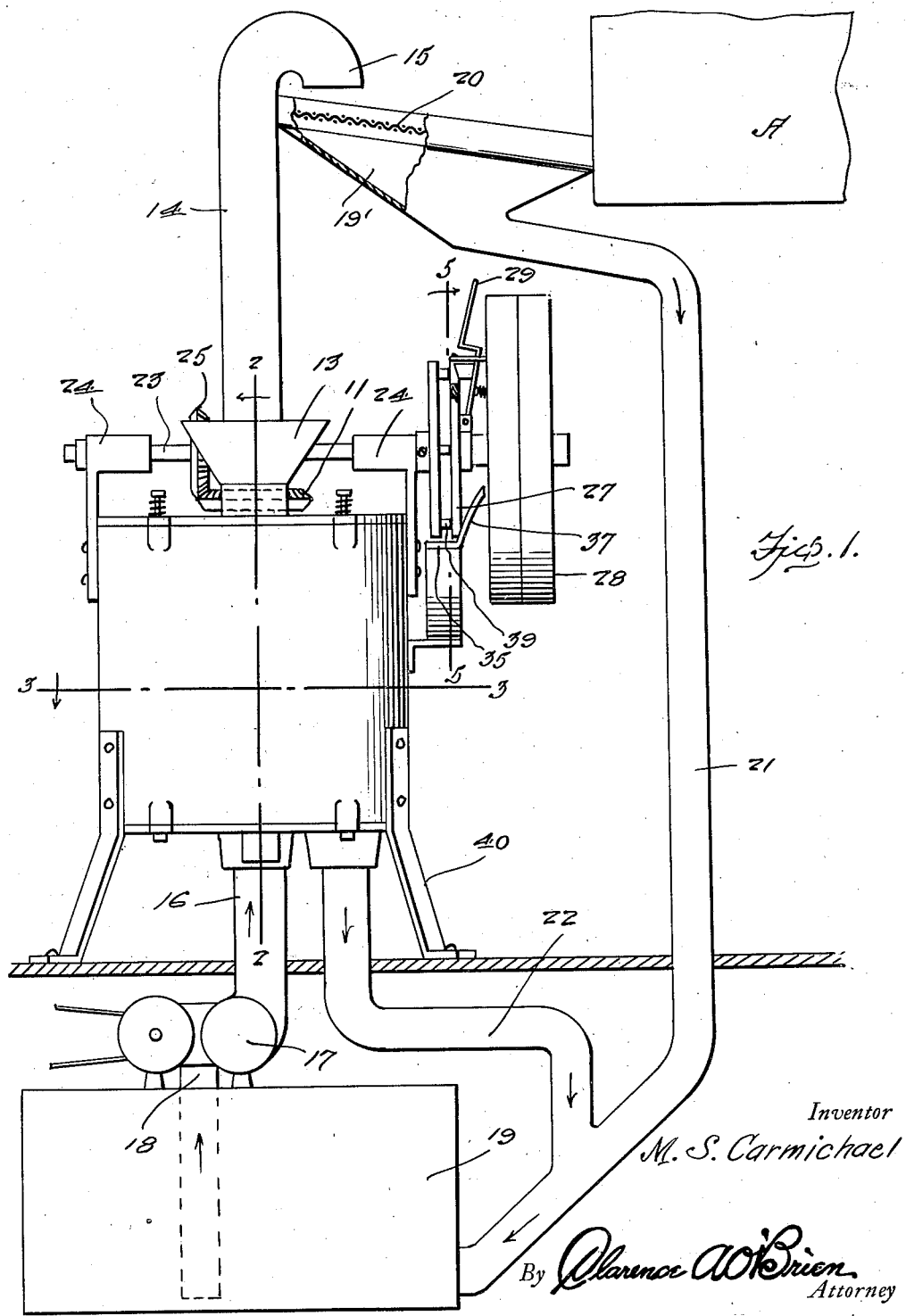

1,828,488

UNITED STATES PATENT OFFICE

MEAD SPENCER CARMICHAEL, OF SPARTA, WISCONSIN

ELEVATING DEVICE

Application filed January 24, 1928. Serial No. 249,035.

This invention relates to new and useful improvements in elevating devices and aims to provide a highly novel, simple and efficient device for use in the elevating of fruit or vegetables within a cannery, and aims to provide a means whereby fruit and vegetables may be elevated from a load to a high level without any great liability of bruising or crushing the fruit or vegetable.

In carrying out the present invention there is provided means whereby fruit or vegetables may be elevated by the force of a water column and discharged into a receiving trough that is constructed for conveying the fluid back to its original source so that it may be again used.

The invention further aims to provide a machine that includes generally a closed drum within which is arranged a plurality of fruit and vegetable receiving tubes that are adapted to first receive the fruits or vegetables and then be successively moved into the path of the fluid whereupon the fruit or vegetables are ejected therefrom.

Furthermore, the device comprises means for intermittently rotating the drum fractional turns and registering the tubes therein, in seriatim, with the remainder of the device to permit of various tubes being charged and others exhausted.

One of the most important objects of this invention is to provide an elevating device that is extremely simple of construction and operation as well as inexpensive of manufacture, the device comprising but relatively few parts, and these so corelated as to reduce the possibilities of disarrangement to a minimum.

With the foregoing and other objects in view as the nature of the invention will be better understood, the same comprises the novel form, combination and arrangement of parts hereinafter more fully described, shown in the accompanying drawings and claimed.

In the accompanying drawings forming part of this application and wherein like reference characters indicate like parts:—

Figure 1 is a side elevation partially in section of a fruit elevating machine constructed in accordance with the present invention.

Figure 2 is an enlarged vertical section taken substantially on the line 2—2 of Figure 1 more clearly disclosing the construction of the drum and the receiving tubes mounted for rotation therein.

Figure 3 is a horizontal section taken substantially upon the line 3—3 of Figure 1.

Figure 4 is an enlarged fragmentary section through the means provided for causing the interrupted rotation of the receiving tubes within the drum.

Figure 5 is an enlarged vertical section of this mechanism taken substantially upon the line 5—5 of Figure 1, and looking in a direction toward the right as indicated by the arrows in said figure, and Figure 6 is an inner side elevation of the unit of the said mechanism that is keyed to the tube rotating shaft and that is adapted to be engaged by a continuously rotating member of the mechanism to cause the rotation of said shaft.

Now having particular reference to the drawings, my novel machine consists of a circular drum or cylinder 5 equipped at its ends with a bottom wall 6 and a lid 7 that are rigidly and water tightly secured to the drum by any means desirable.

Mounted for rotation within this drum or cylinder 5 is a circular unit consisting of an upper and lower plate 8 and 9, respectively, through the centers of which are registering openings through which extends the shaft 10, the lower end of the shaft being journaled within an opening in the bottom wall 6 ot the drum or cylinder, while the shaft extends upwardly through an opening in the cylinder lid 7, said shaft being equipped at its upper end with a beveled gear 11. This rotating unit is keyed to the shaft as indicated at Figure 2 and further includes a plurality of vertically extending tubes 12, the opposite ends of which are arranged within circular openings at the edges of the plates 8 and 9, see Figure 2. Directly above the position of one of the tubes 12 when the rotating unit is at rest, there is formed in the lid 7 of the drum 5 an opening surrounded by a fruit or vegetable receiving hopper 13. Said lid 7 is formed with a further opening within which is arranged one end of a vertically extending exhaust pipe 14, the upper end of which is bent over to provide a spout 15. Directly beneath the opening in the drum lid 7 within which is arranged the pipe 14, the bottom wall 6 of said drum is also formed within an opening within which is arranged a water inlet pipe 16 that has communication with a high pressure water pump 17 operated in any suitable manner and including an inlet pipe 18 that is arranged within a water tank 19. The pump 17 is continuously operating to cause the discharge of the water upwardly through the pipe 16 that has communication with the drum or cylinder. Obviously when the various tubes 12 of the rotating unit within the drum are brought between the pipes 14 and 16 the column of water will pass through that particular tube 12 for forcing the fruit or vegetables therein upwardly through the discharge pipe 14. Obviously the fruit and vegetables are deposited within the various tubes from the material hopper 13.

Arranged directly beneath the spout 15 of the discharge pipe 14 is a water funnel 19' open at its top and provided at the top side with a wall of screening or other foraminous material 20 upon which the fruit and vegetables will be discharged. The shape of the funnel is such that the wall of screening is somewhat inclined so that the material will move by gravity into a receiver A that forms no part of the present invention.

For establishing communication between the funnel 19' and the water tank 19 there is provided a pipe 21 with the obvious result that the water passing into the funnel 19' will flow back to the tank 19 so that it may again be used.

In order that the water within the tubes 12 after the same have moved out of registration with the pipes 14 and 16 will be conveyed back to the supply tank 19 the bottom wall 6 of the drum or cylinder is provided with a further opening as suggested in Figure 1 between which and the return pipe 21 is a branch pipe 22.

The invention further comprises means for imparting interrupted rotation to the rotating unit within the drum or cylinder 5, said means being so constructed that the various tubes 12 will be moved into position successively between the pipes 14 and 16, and there allowed to remain until the contents thereof have been entirely exhausted. Furthermore this feature is provided so that the tube in direct opposition to the tube that is being exhausted may be filled by injecting the fruit or vegetables into the hopper 13 from whence the same flows into the tubes 12 directly therebeneath. This mechanism consists of a horizontal shaft 23 supported within bearings 24—24 above the top wall of the drum or cylinder and in opposed relation as clearly disclosed in Figure 1. Between the bearings, said shaft is equipped with a bevel gear 25 that has mesh with the bevel gear 11 of the vertical shaft 10. One end of this shaft extends considerably beyond the drum or cylinder and loose thereon is a sleeve 26, the inner end of which is formed or equipped with a circular plate 27. Keyed upon this sleeve 26 is a relatively large belt pulley 28. Pivoted to the sleeve 26 at the outer face of the plate 27 is a radially extending lever 29 that is equipped with an inwardly extending pin 30 movable through a notch 31 at the periphery of the plate 27, see Figures 4 and 5. This lever 29 is limited in its swinging movement by reason of a tangential plate 32 secured to the periphery of the plate 27 and formed with a peripheral slot 33 through which the lever 29 is free to move as clearly disclosed in Figure 4. The free end of lever 29 is normally pulled in a direction away from the plate 27 so that the pin 30 will be drawn partly through the notch 31 by reason of a retractile coil spring 34 anchored at its ends to the belt pulley 28 and to said lever. However, in order to cause the swinging movement of the lever 29 against the action of the spring 34 and the consequent movement of the pin 30 in the notch 31 to disengage the disk 38 and the pins 39 thereon, there is supported upon the drum or cylinder 5 directly beneath said plate 27 a transversely extending arcuate shaped track 35 formed with an upstanding side wall 36 that at the upper end of the track extends considerably beyond the track as clearly indicated in Figure 5, and that is flared outwardly as at 37 so that as the lever carrying disc rotates in a direction to move the lever toward the upper end of the track, the outer end of the lever will engage the flared end 37 of the track and be caused to move inwardly to the position indicated in Figure 4 whereupon the pin 30 will be moved through the notch 31 of the plate 27, and there held during a predetermined degree of the rotation of the plate.

Keyed to the shaft 23 in slight spaced relation with the plate 27 is a circular plate 38 formed at its inner face with horizontally extending pins 39 that will be engaged by the pin 30 of the lever 29 when the lever is moved inwardly by its engagement with the track unit 35 for obviously causing the rotation of the plate 38 and consequently the shaft 27 which will result in the turning of the rotating tubular unit within the drum or cylinder 5. The degree of movement of the rotating unit is such as to cause each tube 12 to be successively moved into position between the pipes 14 and 16.

As soon as the tubes are moved into such positions, the lever 29 will disengage from the track unit 35 whereupon the rotation of the shaft 23 will cease, thus permitting the force of the water to discharge the material from the particular tube between the pipes 14 and 16. At the same time, the directly opposed tube is being filled from the hopper 13.

The drum or cylinder 5 is preferably supported above the floor surface and in order to accomplish this said drum or cylinder is equipped with suitable depending legs 40. Furthermore, in actual practice it has been found advisable to arrange the fluid tank 19 beneath the floor which will of course necessitate the engagement of the pipes 16, 21 and 22 through openings in the floor as clearly disclosed in Figure 1.

In view of the foregoing description when considered in conjunction with the accompanying drawings it will at once be apparent that I have provided a highly novel, simple, and extremely meritorious elevating device for fruits and vegetables and even though I have herein shown and described the invention as consisting of certain detail structural elements it is nevertheless to be understood that some changes may be made therein without affecting the spirit and scope of the appended claims.

Having thus described the invention, what I claim as new is:—

1. In an elevator system for vegetables and the like and of the character described, a closed drum, a unit mounted for rotation within the drum and including a plurality of tubes, a water inlet pipe communicating with the bottom of the drum, an outlet and elevator conveyor pipe extending from the top of the drum, said tubes one at a time being adapted to register conjointly with said inlet and said outlet pipe as moved therebetween, means upon the top of said drum whereby the tubes may be loaded, means for rotating the unit, and a source of water under pressure adapted to discharge the material upwardly from the tubes when the same are disposed between said inlet and outlet pipes.

2. In an elevator system for vegetables and the like and of the character described, a closed drum having a water inlet in its bottom wall and a water outlet in its top wall in registration with each other, a rotor mounted within the drum and including a plurality of vertically extending material carrying tubes, means upon the top of said drum whereby the tubes may be loaded, means for rotating the unit with an intermittent motion, and a source of water under pressure, said water being discharged into and through said tubes one at a time and when the same are brought into registration with the inlet and outlet openings in the drum whereupon the material within said tubes is elevated therefrom.

3. In an elevator system for vegetables and the like and of the character described, a closed drum, a unit mounted for rotation within the drum and including a plurality of vertical tubes, a water inlet pipe communicating with the bottom of the drum, and a water outlet pipe extending from the top of the drum, said tubes one at a time registering conjointly with said inlet pipe and said outlet pipe as moved therebetween, means upon the top of said drum whereby the tubes may be loaded, means for rotating the unit, a source of water under pressure for discharging the material upwardly from the tubes when the same are disposed between said inlet and outlet pipes, and means whereby the water remaining in a tube after the discharge of a load therefrom is conveyed to the source of the water supply.

4. In an elevator system for vegetables and the like, a drum, a unit mounted for rotation within said drum and comprising a plurality of parallel tubes, a member having a water inlet communicating with the bottom of said drum, a second member having a water outlet from said drum, means for rotating said unit, a source of water under pressure adapted to pass through said tubes one at a time when disposed between said members in registry with said inlet and said outlet, and means operable when said tubes are not in registry with said inlet and said outlet for discharging the water content thereof.

In testimony whereof I affix my signature.

MEAD SPENCER CARMICHAEL.